Figures 1, 2:
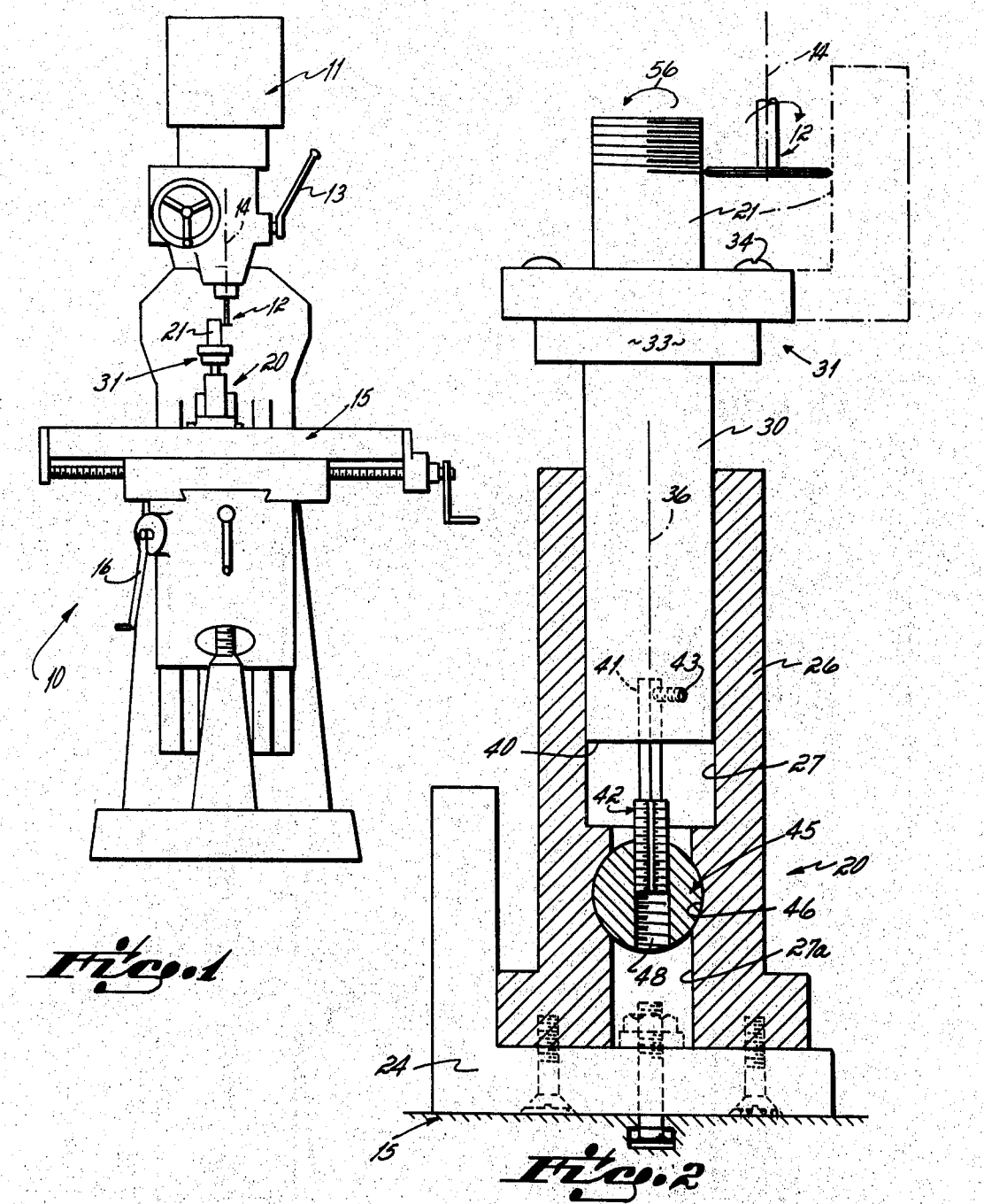

United States Patent [19]
Garrett

[11] 3,850,077
[45] Nov. 26, 1974

[54] THREADER ATTACHMENT
[75] Inventor: Wayne O. Garrett, Amelia, Ohio
[73] Assignee: Hansco, Inc., Cincinnati, Ohio
[22] Filed: Jan. 9, 1974
[21] Appl. No.: 431,685

[52] U.S. Cl................ 90/11.62, 90/11.66, 10/102, 51/95 TG
[51] Int. Cl......................... B23g 1/32, B23g 1/36
[58] Field of Search............ 90/11.58, 11.4, 11.62, 90/11.66; 51/95 TG; 10/102

[56] References Cited
UNITED STATES PATENTS
1,622,190  3/1927  Elstone ............................. 90/11.4
3,704,648  12/1972  Burfoot ........................... 90/11.62

Primary Examiner—Gil Weidenfeld
Attorney, Agent, or Firm—Wood, Herron & Evans

[57] ABSTRACT

An attachment for cutting threads on a workpiece wherein the workpiece is carried by a shaft which is supported for axial and rotary movement in a bearing. Provision is made for securing a tap to the shaft, at an opposite end thereof from the workpiece. The tap is engageable with corresponding threads in a cross-guide which extends diametrically through the bearing. Oversize or undersize threads can be cut by advancing the bearing at a controlled rate past a rotating cutter while the tap is turned in the threads in which it is engaged.

8 Claims, 2 Drawing Figures

THREADER ATTACHMENT

This invention relates to cutting threads on a workpiece by turning the workpiece slowly about its axis while simultaneously advancing it past an off-set rotating cutter.

In various instances it is necessary to cut threads of a non-standard number per inch. For example, to mold a plastic part with standard size threads, it is necessary to cut threads on the mold which are slightly oversize, in order to compensate for the inherent shrinkage of the plastic as it cools from molten state to solid form. The mold threads must be slightly oversize with respect to the desired diameter of the plastic part to be molded, and also with a slightly fewer number of threads per inch, since the plastic part will shrink both in diameter and in axial dimension.

This invention is directed to an attachment whereby specially sized threads, as well as conventional threads, may be cut on a conventional rotating cutting machine having means for supporting and relatively advancing a workpiece past a cutter. The attachment is adaptable for use in cutting a wide range of thread sizes, both in terms of threads per unit length and diameter, on the outside diameter of workpieces as well as on the inside diameter of hollow workpieces.

The attachment of this invention is especially useful in connection with a milling machine, grinder, or a lathe equipped with an auxiliary cutter drive. It can be easily mounted to such machines for use as needed and removed for other operations.

A particular advantage of the invention is the ease with which the attachment may be set to cut threads of different numbers per inch. It is known, as shown in Richards U.S. Pat. No. 320,968 and Elstone U.S. Pat. No. 1,622,190, to cut threads or a spiral groove on a workpiece mounted to a threaded carrier while the carrier is turned within a housing with which its threads are engaged. However, in such structures it is difficult to change the thread size, by reason of the fact that the entire carrier and housing threading must be changed. This invention makes possible much greater versatility for cutting a variety of thread sizes, and is easily changeable from size to size, including non-standard sizes. The attachment includes an elongated bearing member having a longitudinal main bore. A bracket or other means is provided for mounting this member to a support, for example the table of a vertical milling machine. A workpiece carrier has an elongated shaft which is closely fitted within the bore of the bearing member, and the bore forms a sleeve bearing for the shaft which supports and guides the shaft for both rotational and axial movement relative to the bearing. At one end, the workpiece carrier has a flange plate externally of the bore or other means for mounting the workpiece which is to be threaded in position with respect to a cutter, the workpiece projecting axially from the carrier. At an opposite axial end of the shaft, within the bore, externally threaded means is mounted by and projects from the shaft, such as a tap which is releasably secured to a socket in the shaft. The tap projects axially from the shaft in the bore. A cross-guide or crossbar is slidably received in a cross-bore in the bearing member. The cross-guide extends across the main bore at right angles to it, and is supported by the bearing member on either side of the main bore. A diametral or transverse opening extends through the cross-guide and is internally threaded to receive the tap. Desirably these threads are cut by the tap, so that a close screw fit is assured. The cross-guide is positionable in the cross-bore in the bearing member so that the threaded hole in it is aligned with the axis of the main bore and, hence, the axis of the tap, and the tap is threaded into this spring.

By rotating the workpiece carrier relative to the bearing member, the tap is advanced axially by reason of its engagement in the cross-guide threaded hole, and the shaft advances the workpiece correspondingly. The workpiece is thus advanced relative to the cutter as it is turned about its own axis, with the result that threads are cut on the workpiece.

Oversize or undersize threads (relative to those on the tap) are formed by incrementally advancing the bearing member relative to the cutter, in addition to the axial motion of the workpiece relative to the bearing as caused by turning of the tap relative to the cross-guide threaded hole.

The invention can best be further described by reference to the accompanying drawings, in which:

FIG. 1 is a front elevation of a vertical milling machine fitted with a threader attachment in accordance with a preferred embodiment of the invention, and FIG. 2 is an enlarged vertical section of the thread cutting attachment of the type shown in FIG. 1.

FIG. 1 shows one useful environment in which the threader attachment may be used. A conventional "Bridgeport" type vertical milling machine is designated generally at 10. The machine itself is well known in the art and its construction does not comprise the invention. A further description of such machines may be found in Manual No. M—105, published by Bridgeport Machines, Bridgeport, Conn.

The machine includes a drive head 11 and is fitted with a thread cutter 12 which is rotated about a vertical axis 14. The cutter may be a single thread cutter, as shown, or a multiple thread cutter. It should also be understood that the cutter may be a grinding wheel, for grinding hardened threads. For that purpose the attachment is more conveniently used on a grinder, but the operation is the same. The cutter may be shifted upwardly or downwardly by means of an arm 13, but in the embodiment shown it ordinarily remains fixed in vertical position.

The milling machine 10 has a table 15 which can be shifted in a horizontal X-Y frame of reference with respect to the axis 14 of cutter 12 by two conventional feed handles. Table 15 is also adjustable vertically, parallel to the axis of cutter 12, by a crank 16.

A preferred form of thread cutting attachment is designated generally by 20 and in use is mounted to the table 15. A workpiece 21 is presented by the attachment in proximity to the cutter 12. The particular workpiece shown is to be threaded on its outside diameter, but it should be understood that the attachment can also be used in cutting threads on the inside surface of a cylindrical cavity, as in a mold cavity.

The attachment 20, workpiece 21 and a cutter 12 are shown in detail in FIG. 2. The attachment desirably includes mounting means in the form of a bracket 24 which is an L-shaped member adapted to mount the attachment with the workpiece axis vertical, as shown in FIGS. 1 and 2, or with its axis horizontal, as for example if it were to be threaded on a lathe. An elongated bearing member 26 is mounted to the bracket, for example by screws, and may be generally cylindrical in shape.

Bearing member 26 has an elongated cylindrical main bore 27 which preferably has a reduced or smaller diameter bore portion 27a at the lower end thereof. The bore 27 forms a sleeve bearing for the elongated shaft 30 of a workpiece carrier generally designated at 31. At its upper end, externally of bore 27, workpiece carrier 31 has a flange or head 33 to which workpiece 21 is secured as by screws 34. The table 15 is positioned, with respect to the cutter, so that the axis 36 of shaft 30 is parallel to but offset from the axis 14 of cutter 12 (see FIG. 2).

At an opposite end 40 of shaft 30 within bore 27, the workpiece carrier 31 is provided with externally threaded means. For this purpose it preferably has a tap socket 41 of square cross section. This socket receives and mounts the squared shank of a tap 42, which is held in place in the socket 41 by a set screw 43.

Tap 42 is selected to have the appropriate number of threads per inch for threading the particular workpiece which is to be cut. While the number of threads per inch on tap 42 will correspond generally to and will determine the number of threads per inch that will be cut on workpiece 21, it should be pointed out that the two need not be identical with each other where oversize or undersize threads are to be cut.

A cross-guide or crossbar, preferably in the form of a round bar 45, is received in a cross-bore 46 in bearing member 26. Cross-guide and cross-bore 46 extend perpendicularly to the axis 36 of shaft 30 and tap 42 and intersect that axis. A transverse or radial hole 48 is formed in the cross-guide, and is internally threaded to receive the threads of tap 42. (For accuracy it is desirably that tap 42 be used to cut the internal threads in cross-bore hole 48.) The cross-guide is slidable and rotatable in cross-bore 46, for aligning hole 48 with respect to axis 36 so that the tap 42 can be threaded into it.

In use, a particular tap 42 is selected having the desired threads for forming the workpiece threads, and is secured in socket 41 in the end 40 of shaft 30 of workpiece carrier 31. For this purpose the carrier is first slid axially out of bore 27. (In this connection, it should be noted that shaft 30 should be sized accurately with respect to bore 27 so that a good bearing is established and there is no more than negligible play of the shaft within the bore as the shaft is rotated and shifted axially through the operating range.) The cross-guide 45 is then slid into cross-bore 46 to bring opening 48 approximately in alignment with the tap, so that when the workpiece carrier 31 is turned slowly the tap aligns the cross-guide as it threads itself into opening 48. With workpiece 21 attached to mounting flange 33, the table 15 is positioned so that the cutter, rotating about its axis 55, is brought into cutting engagement with the side surface of the workpiece 21, to cut threads of the desired diameter. Workpiece carrier is turned (manually, in the usual case) at a slow rate, so as to rotate the workpiece as indicated by the arrow 56. As this occurs, tap 42 shifts axially upwardly or downwardly with respect to cross-guide hole 48, thereby advancing the workpiece axially at a corresponding rate. The main bore 27 supports and guides shaft 30 during this operation.

If it is desired to cut over or undersize threads (for example, in cutting a female mold with oversize threads to compensate for shrinkage of plastic to be molded in it), table 15 should be shifted incrementally by turning handle 16 at a rate sufficient to provide the offsize increment. This shifting may be continuous or, in view of its small amount, in discrete steps, e.g., once for each workpiece revolution. By way of example, if a plastic to be molded shrinks at a rate, say, of 0.001 inch per inch, the mold threads should be oversize in that proportion. If the plastic part is to have 16 threads per inch, then the table 15 should be shifted 0.001 inch for every 16 turns of the workpiece, or about 0.00006 inch per turn. (Alternatively, a tap 42 and opening 48 can be threaded with oversize or undersize threads.) To cut threads of the same number per inch as those on the tap, it is not necessary to adjust table 15 upwardly or downwardly during cutting.

As previously expressed, one of the advantages of this attachment is the ease with which it enables threads of different sizes and diameters to be cut. To cut a different number of threads per inch, a different tap 42 is readily inserted by sliding the workpiece carrier axially out of bore 27 and inserting the appropriate tap in socket 41. Several openings 48 can be provided in cross-guide 45, each threaded to interfit with a different tap, so that the change is accomplished simply by sliding the cross-guide to align the appropriate hole.

In the embodiment described, the support for the bearing member is the bracket 24 which is adapted for mounting to the table of a milling machine. It will be apparent that other forms of supports may be used, configured for mounting to a lathe, grinder, or other rotating cutter machine.

What is claimed is:

1. An attachment for use in cutting threads by axially advancing a workpiece relative to a rotating cutter which is offset from the workpiece, while turning the workpiece about its axis, said attachment comprising, a bearing member presenting an elongated cylindrical bore with a longitudinal axis, means for mounting said member to a support, a workpiece carrier having an elongated shaft received within said bore, said bore forming a bearing for the shaft and supporting and guiding the shaft for both rotational and axial movement relative to it, said workpiece carrier having workpiece attachment means at an end thereof for attaching a workpiece to it so that the workpiece will project axially from the carrier and outwardly beyond said bore, externally threaded means in said bore mounted by and extending axially from said shaft at an end thereof opposite from said attachment means, said bearing member presenting a cross-bore which intersects the axis of said bore at a right angle thereto, a cross-guide slidably received in said cross-bore and extending across the axis of said bore, said bearing member supporting said cross-guide on either side of said axis, said cross-guide presenting internally threaded means having an axis extending transversely through said cross-guide, and sized to receive said externally threaded means, said internally threaded means being alignable with respect to the axis of said bore, by movement of the cross-guide in the cross-bore, so that said externally threaded means can be threaded into it, said workpiece carrier being advanceable in said bore by turning said carrier so that said externally threaded means is advanced by said internally threaded means.

2. An attachment for use in cutting threads by axially advancing a workpiece relative to an offset rotating cutter offset from the workpiece while turning the workpiece about its axis, said attachment comprising, an elongated bearing member having a longitudinal bore in it, means for mounting said bearing member to a support, a workpiece carrier having an elongated shaft received within the said bore of said bearing member, the said bore forming a bearing for the shaft in which the shaft is movable both rotationally and axially, said workpiece carrier having workpiece attachment means at an end thereof for attaching a workpiece to it so that the workpiece will project axially from the carrier and outwardly beyond said bore, means at an opposite axial end of said shaft for releasably securing a tap to it so that the tap will project from the shaft axially in the bore of the bearing member, a cross-guide slidably received in a cross-bore in said bearing member, said cross-guide extending across the bore at a right angle thereto, said bearing member supporting the cross-guide in the cross-bore on each side of the bore, said cross-guide having a threaded opening extending through it transversely which is alignable, with respect to the axis of said bore, by movement of the cross-guide in the cross-bore, so that a tap mounted to said shaft can be threaded into said threaded opening, said workpiece carrier being advanceable axially by turning said carrier with respect to said bearing member so that a tap advances in said threaded opening.

3. The attachment of claim 2 wherein both said cross-guide and said cross-bore are cylindrical, so that said cross-guide is both slidable and rotatable in said cross-bore.

4. The attachment of claim 2 wherein said opening has been threaded by the threads of said tap.

5. The attachment of claim 2 wherein said workpiece attachment means comprises a flange to which the workpiece can be attached by screws.

6. The attachment of claim 2 wherein the means for mounting the bearing member comprise an L-shaped bracket having two mounting surfaces, said surfaces oriented at right angles to each other.

7. The attachment of claim 2 wherein the means at the opposite axial end of said shaft for releasably securing a tap comprise a socket sized to receive a shank of said tap and a set screw in said shaft for holding said shank in said socket.

8. Apparatus for cutting threads on a workpiece comprising, a machine having a cutter rotatable about a cutter axis, a table movable parallel to the cutter axis and positionable in an X-Y frame of reference in a plane perpendicular to the cutter axis, a thread cutter attachment comprising, a bearing member presenting an elongated cylindrical bore with a longitudinal axis, means mounting said member to said table with said longitudinal axis parallel to but offset from said cutter axis, a workpiece carrier having an elongated shaft received within said bore, said bore forming a bearing for the shaft and supporting and guiding the shaft for both rotational and axial movement relative to it, said workpiece carrier having workpiece attachment means at an end thereof securing a workpiece so that the workpiece projects axially from the carrier and outwardly beyond said bore, externally threaded means in said more mounted by and extending axially from said shaft at an end thereof opposite from said attachment means, said bearing member presenting a cross-bore which intersects the axis of said bore at a right angle thereto, a cross-guide slidably received in said cross-bore and extending across the axis of said bore, said bearing member supporting said cross-guide on either side of said axis, said cross-guide presenting internally threaded means having an axis extending transversely through said cross-guide and sized to receive said external threaded means, said internally threaded means being alignable, with respect to the axis of said bore, by movement of the cross-guide in the cross-bore, so that said externally threaded means can be threaded into it, and said workpiece carrier being advanceable in said bore by turning said carrier so that said externally threaded means is advanced by said internally threaded means, said machine further including means for moving said table in a direction parallel to the axis of said shaft.

* * * * *